United States Patent [19]

Jain

[11] Patent Number: 5,090,973

[45] Date of Patent: Feb. 25, 1992

[54] PSA EMPLOYING HIGH PURITY PURGING

[75] Inventor: Ravi Jain, Piscataway, N.J.

[73] Assignee: The BOC Group, Inc., New Providence, N.J.

[21] Appl. No.: 601,972

[22] Filed: Oct. 23, 1990

[51] Int. Cl.$^5$ .............................................. B01D 53/04
[52] U.S. Cl. .......................................... 55/26; 55/62; 55/68; 55/74; 55/75; 55/179; 55/387; 55/389
[58] Field of Search .................... 55/21, 25, 26, 33, 58, 55/59, 62, 68, 74, 75, 161–163, 179, 387, 389

[56] References Cited

U.S. PATENT DOCUMENTS

| | | | |
|---|---|---|---|
| 3,922,149 | 11/1975 | Ruder et al. | 55/21 |
| 4,348,213 | 9/1982 | Armond | 55/25 |
| 4,371,380 | 2/1983 | Benkmann | 55/26 |
| 4,428,372 | 1/1984 | Beysel et al. | 55/21 X |
| 4,439,213 | 3/1984 | Frey et al. | 55/33 X |
| 4,482,362 | 11/1984 | Yamazaki et al. | 55/62 |
| 4,715,867 | 12/1987 | Vo | 55/58 X |
| 4,732,580 | 3/1988 | Jain et al. | 55/26 |
| 4,740,378 | 4/1988 | Jameson | 426/419 |
| 4,761,167 | 8/1988 | Nicholas et al. | 55/25 X |
| 4,765,804 | 8/1988 | Lloyd-Williams et al. | 55/25 X |
| 4,783,203 | 11/1988 | Doshi | 55/26 X |
| 4,848,985 | 7/1989 | Sadkowski | 55/26 |
| 4,861,361 | 8/1989 | Jain et al. | 62/18 |
| 4,913,709 | 4/1990 | Kumar | 55/26 |
| 4,914,218 | 4/1990 | Kumar et al. | 55/26 |
| 4,917,710 | 4/1990 | Haruna et al. | 55/62 X |
| 4,925,461 | 5/1990 | Gemba et al. | 55/62 X |
| 4,963,339 | 10/1990 | Krishnamurthy et al. | 55/26 X |

FOREIGN PATENT DOCUMENTS 1586961  3/1981  United Kingdom.

OTHER PUBLICATIONS

"Inert Gas Generation Systems for Offshore Platforms" by Beaver & Graham; Energy Progress (vol. 6, No. 3); Sep. 1986; pp. 149–154.

*Primary Examiner*—Robert Spitzer
*Attorney, Agent, or Firm*—David A. Draegert; Robert I. Pearlman

[57] ABSTRACT

Described is an improved pressure-swing adsorption process and apparatus which enable more thorough regeneration and, thus, a higher yield of one or more selected gases and a higher productivity of the adsorbent material. The pressure-swing adsorption process and apparatus for obtaining a selected gas are of the type wherein a PSA product gas is obtained by the steps of pressurizing, producing, purging and venting a vessel that contains an adsorbent for a gas other than the selected gas. The improvement is a step of purging the adsorbent with a purge gas that has a higher concentration of the selected gas than the PSA product gas.

13 Claims, 2 Drawing Sheets

5,090,973

PSA EMPLOYING HIGH PURITY PURGING

FIELD OF INVENTION

This invention relates generally to the separation and purification of gases utilizing pressure-swing adsorption (PSA) techniques.

BACKGROUND OF THE INVENTION

PSA processes are normally operated by alternating adsorption and desorption of certain gaseous components using a bed of a suitable adsorbent material. When a vessel containing an adsorber bed is pressurized with a gaseous feed mixture, certain components of the feed gas are adsorbed on the bed material and are retained when the residual gas mixture is withdrawn as product. The withdrawn product mixture is rich in one or more selected gases, depending upon the feed mixture and the properties of the bed material. Next, the bed is regenerated, usually by venting to the environment followed by purging with a purging gas, so as to desorb the retained components and prepare the bed for another adsorption-desorption cycle.

The yield of a PSA process is defined as the ratio of the quantity of selected gas in the PSA product to that in the feed. The productivity of the adsorbent material, called the sieve specific product, is the quantity of gas produced per unit time divided by the quantity of adsorbent material.

In a conventional PSA process, the bed is typically purged with a portion of the gas that has been previously withdrawn as product. Thus, the impurity levels in the bed cannot be reduced below that of the PSA product itself. This constitutes a limit on the extent to which the bed is regenerated and, thus, on the yield and the productivity of the adsorbent material.

UK patent no. 1,586,961 to BOC Limited discloses an oxygen PSA process in which the PSA product is cryogenically separated to produce higher purity oxygen and a nitrogen waste gas. The nitrogen waste gas, which has a lower oxygen concentration than the PSA product, is used to purge the adsorbent beds.

SUMMARY OF THE INVENTION

The invention relates to an improved pressure-swing adsorption process and apparatus which enable more thorough regeneration and, thus, a higher yield of one or more selected gases and a higher productivity of the adsorbent material. The improvement arises because a more thoroughly desorbed bed has a higher adsorption capacity for the next adsorption step.

One aspect of the invention is a pressure-swing adsorption process for obtaining a selected gas, of the type wherein a PSA product gas is obtained by the steps of pressurizing, producing, purging and venting a vessel that contains an adsorbent for a gas other than the selected gas, the improvement comprising: purging the adsorbent with a purge gas that has a higher concentration of the selected gas than the PSA product gas.

A second aspect of the invention is a pressure-swing adsorption apparatus for obtaining a selected gas, the apparatus comprising a vessel, an adsorber in the vessel, a means for withdrawing a PSA product gas from the vessel, and a means for purging the adsorber with a purge gas, the improvement comprising: a source of purge gas having a higher concentration of the selected gas than the PSA product gas.

Various sources of higher purity purge gas may be used depending upon the overall process. This gas may be purified PSA product gas, such as obtained by catalytic or cryogenic separation. Alternately, the gas may be obtained from an external supply, such as a storage tank of liquefied gas.

DETAILED DESCRIPTION OF THE INVENTION

Conventional PSA processes are normally operated by alternating adsorption and regeneration in a bed in a cyclic manner. In two bed PSA systems, each bed undergoes the steps of pressurizing, producing, pressure equalizing, venting, purging, and pressure equilizing in sequence, and one bed undergoes pressurization and production while the other is vented and purged.

Figure 1:
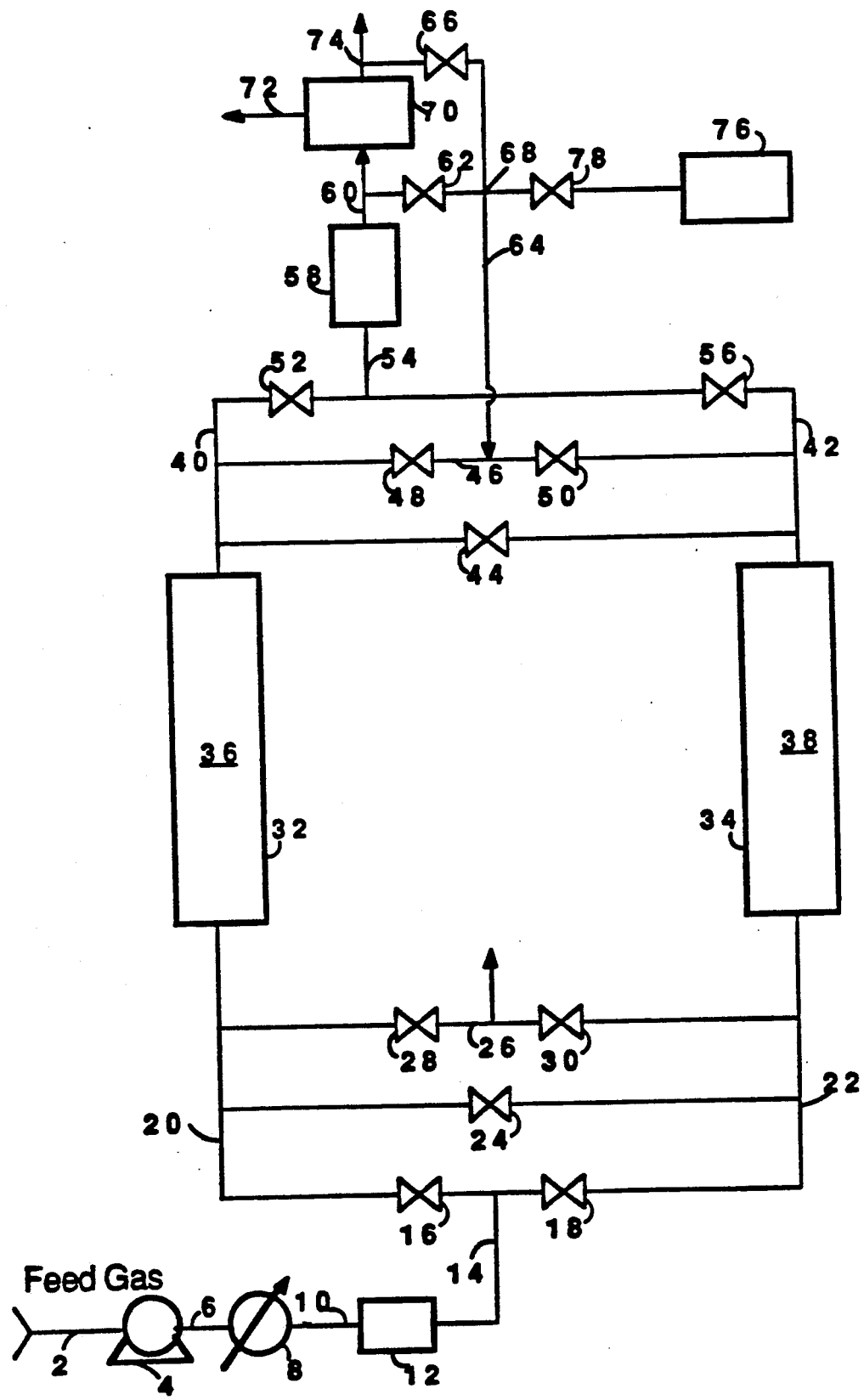
FIG. 1 is an embodiment of the invention showing the separation of a gas mixture by pressure-swing adsorption according to this invention.

In the two bed PSA apparatus shown in FIG. 1, the feed gas containing components to be separated is passed via line 2 to a compressor 4. The compressed gas at line 6 is passed to a cooler/water separator 8 where the temperature of the compressed gas is reduced and any liquid water contained in the cooled gas is removed. The gas exiting the cooler/separator 8 at line 10 enters a feed buffer 12 and is then sent to the piping manifold 14. The gas at manifold 14 is sent either to vessel 32 containing adsorbents 36 through open valve 16 and piping manifold 20 or to vessel 34 containing adsorbents 38 through open valve 18 and the piping manifold 22, depending on which of the two vessels is ready for production.

When vessel 32 is to be used for production, this vessel is first pressurized by opening valve 16 on the inlet side of the bed while valves 44, 48 and 52 on the outlet side of the bed remain closed. The gas mixture to be separated enters vessel 32 via manifold 20. For the production step, valve 52 is opened and the separated gas mixture, containing one or more selected gases and essentially free of undesired components, is passed via manifold 40, open valve 52 and manifold 54 to the product receiver 58 while the components to be separated from the gas mixture are retained on adsorbents 36 contained inside the vessel 32. The product in the product receiver 58 can be taken off via line 60 and sent downstream for further processing or it may be used as is.

While vessel 32 is being used for pressurization and production, vessel 34 undergoes regeneration by venting and purging. For this purpose, vessel 34 is first vented via manifold 22, open valve 30 and the manifold 26 to reduce its pressure to close to atmospheric pressure. Optionally, vessel 34 may be evacuated with a vacuum pump (not shown) connected to manifold 26. After venting, vessel 34 is purged using low pressure purge gas, typically supplied from the product receiver 58 via manifold 60, open valve 62 and piping manifold 64. The purge gas passes through manifold 46 and open valve 50 and enters the top of the vessel 34 through manifold 42. During the passage of the purge gas through vessel 34, undesired components previously adsorbed on adsorbents 38 are desorbed. The purge gas containing these components passes to manifold 26 via manifold 22 and open valve 30. Again, as in the case of the vent step, a vacuum pump at manifold 26 may be used to provide purge under vacuum and obtain additional regeneration.

After the end of the production step for vessel 32 and the purging step for vessel 34, the pressures in vessels 32 and 34 are equalized by opening valve 44 connecting manifolds 40 and 42 and valve 24 connecting manifolds 20 and 22. After the completion of the pressure equalization step, vessel 32 undergoes the steps of venting and purging as previously described for vessel 34 and vessel 34 undergoes the steps of pressurization and production as previously described for vessel 32. Vessel 32 is vented via manifold 20, open valve 28 and the manifold 26. For purging of vessel 32, purge gas, typically from the product receiver 58, passes to vessel 32 via manifold 60, open valve 62, manifold 64, manifold 46, open valve 48 and manifold 40 and emerges from vessel 32 via manifold 20, open valve 28 and the manifold 26. For the pressurization of vessel 34, valve 18 is opened while valves 44, 50 and 56 remain closed. For production using vessel 34, the separated gas mixture leaves the vessel and passes to the product receiver 58 via manifold 42, open valve 56 and manifold 54. The adsorbents 38 inside vessel 34 are identical to the adsorbents 36 inside vessel 32.

After the end of the production step for vessel 34 and the purging step for vessel 32, the pressures in vessels 32 and 34 are equalized by opening valves 44 and 24 as described previously. After this step, the entire cycle, starting with pressurization and production of vessel 32 and with regeneration by venting and purging of vessel 34, is repeated. The process can operate continuously in this manner.

The process and apparatus that have been described to this point are conventional. The major difference between the present invention and the prior art is the use of a purge gas having a concentration of the selected gas higher than the PSA product itself. Various sources of higher purity gas may be used depending upon the overall process.

First, a gas purifier 70 may be installed downstream from the product receiver 58. The purifier may be a cryogenic separator or a catalytic converter wherein the product gas exiting manifold 60 is converted into a higher purity product at line 74 and a waste product at line 72. A portion of the higher purity product is returned via open valve 66 to a junction 68 with the purging manifold 64.

Alternatively, a source 76 of higher purity gas may be connected to junction 68 via a valve 78. The source 76 may comprise a vaporizer and a storage tank or reservoir of liquefied gas, such as is frequently provided to insure uninterrupted supply in case of equipment failure in the PSA process. The normal boil off from such a storage tank may be used to provide part or all of the higher purity purge gas. The vaporizer can provide an additional purge gas, as needed.

The difference between the present invention and the prior art process can be better understood by comparing a complete process cycle. A typical complete cycle for a two bed process utilizing prior art techniques is given in Table I below.

TABLE I

| | Conventional Two Bed PSA Cycle | | |
|---|---|---|---|
| Step | | Valves Open | Time (sec) |
| a. | Pressurize vessel 32, vent vessel 34 to atmosphere | 16, 30 | 10 |
| b. | Produce using vessel 32, vent vessel 34 to atmosphere | 16, 30, 52 | 10 |
| c. | Produce using vessel 32, purge vessel 34 from product receiver 58 | 16, 30, 50, 52, 62 | 96 |
| d. | Pressure equalize vessels 32 and 34 | 24, 44 | 4 |
| e. | Pressurize vessel 34, vent vessel 32 to atmosphere | 18, 28 | 10 |
| f. | Produce using vessel 34, vent vessel 32 to atmosphere | 18, 28, 56 | 10 |
| g. | Produce using vessel 34, purge vessel 32 from product receiver 58 | 18, 28, 48, 56, 62 | 96 |
| h. | Pressure equalize vessels 32 and 34 | 24, 44 | 4 |
| | | TOTAL | 4.0 min |

In the process of Table I, the purge gas used in steps c and g is taken off from the product receiver 58 by opening valve 62 and sending the purge gas to manifold 64.

A typical cycle for an improved process involving higher purity purge which is the subject matter of this invention is given in Table II below.

TABLE II

| | Enhanced PSA Cycle Using Higher Purity Purge Gas | | |
|---|---|---|---|
| Step | | Valves Open | Time (sec) |
| a. | Pressurize vessel 32, vent vessel 34 to atmosphere | 16, 30 | 10 |
| b. | Produce using vessel 32, vent vessel 34 to atmosphere | 16, 30, 52 | 10 |
| c1. | Produce using vessel 32, purge vessel 34 from product receiver 58 | 16, 30, 50 52, 62 | 76 |
| c2. | Produce using vessel 32, purge vessel 34 with higher purity purge gas from source 76 | 16, 30, 50 52, 78 | 20 |
| d. | Pressure equalize vessels 32 and 34 | 24, 44 | 4 |
| e. | Pressurize vessel 34, vent vessel 32 to atmosphere | 18, 28 | 10 |
| f. | Produce using vessel 34, vent vessel 32 to atmosphere | 18, 28, 56 | 10 |
| g1. | Produce using vessel 34, purge vessel 32 from product receiver 58 | 18, 28, 48, 56, 62 | 76 |
| g2. | Produce using vessel 34, purge vessel 32 with higher purity purge gas from source 76 | 18, 28, 48, 56, 78 | 20 |
| h. | Pressure equalize vessels 32 and 34 | 24, 44 | 4 |
| | | TOTAL | 4.0 min |

For the cycle in Table II, the purge step has been split in two stages. The first stage purge (step c1 or g1) is same as in the conventional PSA process of Table I. The second stage purge (step c2 or g2) uses purge gas of higher purity than obtained directly from product receiver 58. Higher purity purge gas from a source 76 enters junction 68 and piping manifold 64 through open valve 78. Preferably, valve 62 remains closed during this high purity purging step so that the flow of gas from product receiver 58 is blocked. Depending on the amount of higher purity purge gas available, steps c2 and g2 may constitute part of or all the entire purge step. In the latter case, steps c1 and g1 are eliminated.

Figure 2:
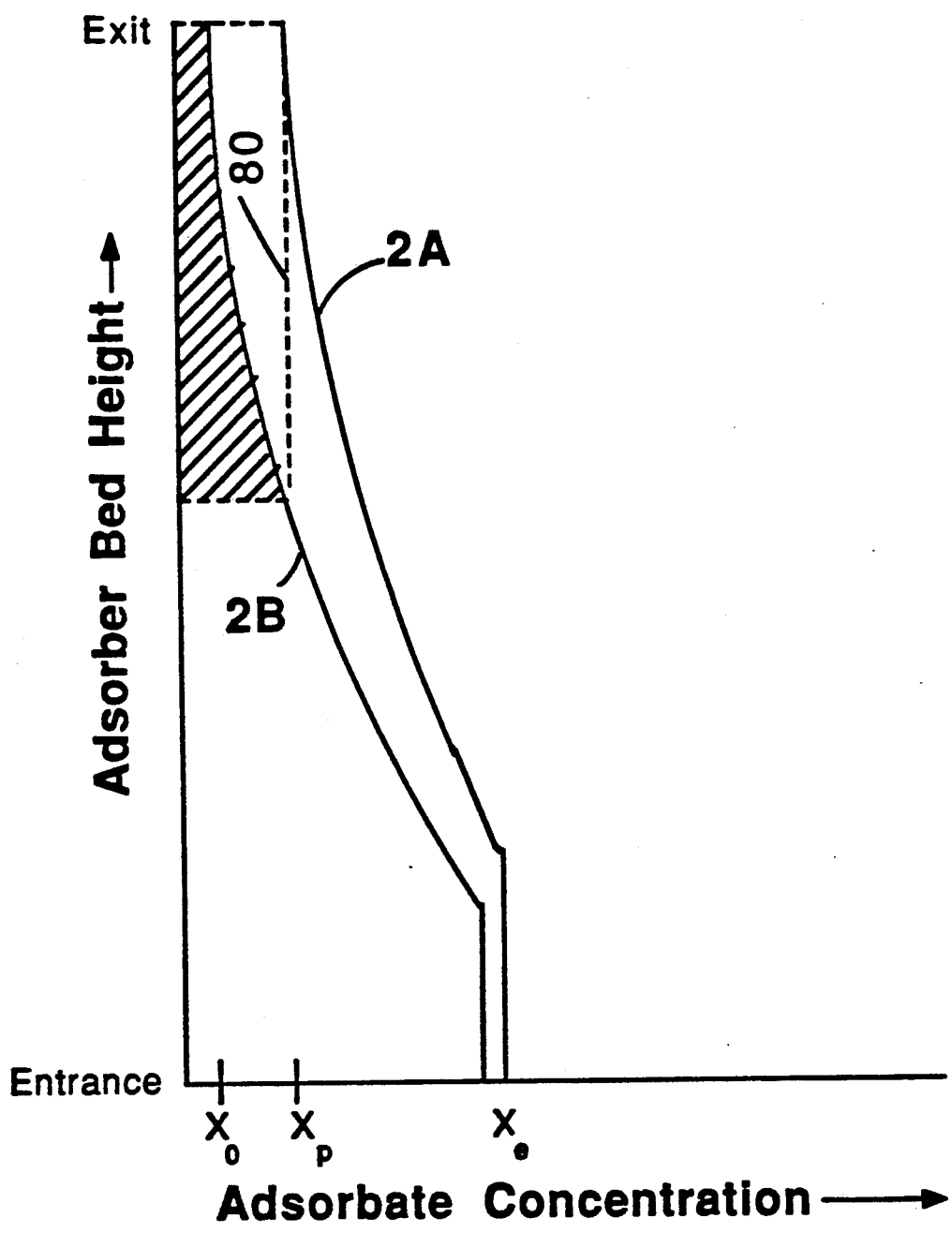
FIG. 2 compares concentration profiles in the adsorbent vessel at the end of regeneration for a conventional PSA process and a PSA process according to present invention.

A possible explanation of the improvement of the present invention can be seen from a consideration of the expected variation of the adsorbate concentration along the adsorber bed from the entrance to the exit ends. FIG. 2 illustrates two typical adsorbate concentration profiles at the end of the purging step. Curve 2A illustrates the case where only the PSA product is used for purging. The adsorbate concentration decreases from $X_e$ at the entrance to $X_p$ at the exit. Curve 2B illustrates the case where at least some of the purge gas has a purity higher than that of the PSA product. Because the exit end of the PSA vessel is regenerated more thoroughly, the adsorbate concentration decreases from $X_e$ to a level $X_o$ lower than $X_p$. The more thorough purging produces a region of length 80 where the adsorbate concentration is less than $X_p$ and improves the PSA process performance since the bed has a higher adsorption capacity for each adsorption cycle.

Operating conditions and the adsorbents used in the PSA process depend on the gas mixture to be separated and the desired final product.

For the separation of air to provide an oxygen-enriched product (90-95% oxygen), the feed is typically at a pressure between 110 to 276 kPa (16 to 40 psia) while the vent and purge steps are carried out at a pressure between 28 kPa (4 psia) and atmospheric. Commercially available zeolites of type A or X are used as adsorbents. For the separation of air to provide nitrogen enriched product (95-99.99% nitrogen), the feed is typically at a pressure between 276 to 1034 kPa (40 and 150 psia) while the vent and purge steps are carried out at pressures between 28 kPa (4 psia) and atmospheric. Carbon molecular sieves manufactured by Bergwerksverband GmbH in Germany, Kuraray Chemical Company in Japan and Calgon Corporation in the United States are typically used as adsorbents for nitrogen enrichment. In many cases, the gas mixture to be separated requires drying prior to separation, and an adsorbent such as silica gel or activated alumina may be used for this purpose, in either the same or separate vessel.

A list of adsorbents used in various commercial PSA processes is given by Keller (in "Industrial Gas Separations", T. E. Whyte; C. M. Yon and E. H. Wagener eds., ACS Symp. Ser. no. 223, ACS, Washington 1983, p. 148). Most PSA processes operate at temperatures close to ambient, though PSA processes that operate at temperatures higher and lower than ambient are known in the prior art. Some PSA processes, such as for separating hydrogen, operate at pressures as high as 4.2 MPa (600 psia).

The PSA product is sometimes further processed to provide a higher purity product. For one example, a nitrogen PSA product containing 0.1 to 1.0% oxygen can be catalytically purified to increase the nitrogen concentration by removing virtually all of the oxygen. Suitable catalysts, such as DeOxo D from Engelhard Corporation, in the United States, are commercially available. Beaver et al. describe a catalytic system for the purification of a nitrogen stream containing 2% oxygen in Energy Progress, vol 6, No. 3, September 1986, p. 152. For a second example, U.S. Pat. Nos. 4,732,580 and 4,861,361 describe a system for purifying a PSA product by cryogenic distillation. Part of the higher purity product from the catalytic purification or the cryogenic distillation can be used to provide the higher purity purge in steps c2 and g2 of Table II.

EXAMPLES

Experiments with a two-bed nitrogen PSA unit were conducted to determine the effect of higher purity purging on PSA process performance. The process cycle for all experiments is that shown in Table III. For comparative Example 1, the purged gas for steps c and f was the nitrogen-rich PSA product gas from a product receiver 58. For Examples 2 and 3, the purge gas was a higher purity nitrogen from a storage tank 76.

The full cycle time was 6.0 minutes in all cases. The nitrogen PSA beds contained a total of 196.5 liters of carbon molecular sieve (CMS) manufactured by Kuraray Chemical Company in Japan. The feed gas for all experiments was dry compressed air at a bed inlet pressure of 846 kPa (122.7 psia) and a bed inlet temperature of 20° C. (68° F.).

TABLE III

| Step | | Time (sec) |
|---|---|---|
| a. | Pressure equalize vessels 32 and 34 | 4 |
| b. | Pressurize vessel 32, vent vessel 34 to atmosphere | 20 |
| c. | Produce using vessel 32, purge vessel 34 | 156 |
| d. | Pressure equalize vessels 32 and 34 | 4 |
| e. | Pressurize vessel 34, vent vessel 32 to atmosphere | 20 |
| f. | Produce using vessel 34, purge vessel 32 | 156 |
| | TOTAL | 6.0 min |

Certain parameters and results of three examples are given in Table IV. Standard conditions are 1 atm and 21° C. (70° F.).

TABLE IV

| Example | 1 | 2 | 3 |
|---|---|---|---|
| Product Flow Rate (Std. l/min) | 85.5 | 99.0 | 103.5 |
| Product Impurity Concentration (% $O_2$) | 0.1% | 0.1% | 0.1% |
| Purge to Feed Ratio (%) | 11.2 | 10.6 | 13.0 |
| Purge Concentration (% $O_2$) | 0.1 | <0.001 | <0.001 |
| Nitrogen Yield (%) | 29.7 | 32.1 | 33.2 |
| Sieve Specific Product (Std. $m^3 hr^{-1} m^{-3}$) | 26.4 | 30.4 | 31.8 |

Compared to the conventional PSA process of Example 1, the relative improvements in nitrogen yield are 8.1% and 11.8% for Examples 2 and 3, respectively. For sieve specific product, the relative improvements are 15.2 and 20.5%, respectively.

Comparison of the prior art processes with the present invention illustrates the process improvements obtained by using higher purity purge gas.

In the foregoing discussion, the invention has been described with respect to specific PSA processes and apparatus. Many variations of basic PSA cycles are known in the prior art and can be adapted without departing from the scope of the invention which is defined by the following claims.

What is claimed is:

1. In a pressure-swing adsorption process for obtaining a selected gas, of the type wherein a PSA product gas is obtained by the steps of pressurizing, producing, purging and venting a vessel that contains an adsorbent for a gas other than the selected gas, the improvement comprising:
   purging the adsorbent with the PSA product gas and purging the adsorbent with a purge gas that has a higher concentration of the selected gas than the PSA product gas.

2. The process of claim 1 further comprising the step of obtaining the purge gas by vaporizing the liquid phase of the selected gas.

3. The process of claim 1 further comprising the step of obtaining the purge gas by purifying the PSA product gas.

4. The process of claim 3 wherein the purification step includes a step of cryogenically separating the selected gas from the PSA product gas.

5. The process of claim 3 wherein the purification step includes a step of catalytically separating the selected gas from the PSA product gas.

6. The process of claim 1 wherein the adsorbent is purged with the PSA product gas prior to purging with the purge gas.

7. In a pressure-swing adsorption process for obtaining a selected gas, of the type wherein a PSA product gas is obtained by the steps of pressurizing, producing, purging and venting a vessel that contains an adsorbent for a gas other than the selected gas, the improvement comprising:
vaporizing the liquid phase of the selected gas to obtain a purge gas that has a higher concentration of the selected gas than the PSA product gas, and purging the adsorbent with the purge gas.

8. In a pressure-swing apparatus for obtaining a selected gas, the apparatus comprising a vessel, an adsorber in the vessel, means for withdrawing a PSA product gas from the vessel, and means for purging the adsorber with the PSA product gas, the improvement comprising:
means for purging the adsorber with a purge gas from a source of purge gas having a higher concentration of the selected gas than the PSA product gas.

9. The apparatus of claim 8 wherein the source of the purge gas comprises a vaporizer and a reservoir of the liquid phase of the selected gas.

10. The apparatus of claim 7 wherein the source of purge gas includes a means for purifying the PSA product.

11. The apparatus of claim 10 wherein the purification means includes a cryogenic separator.

12. The apparatus of claim 10 wherein the purification means includes a catalytic reactor.

13. In a pressure-swing apparatus for obtaining a selected gas, the apparatus comprising a vessel, an adsorbed in the vessel, means for withdrawing a PSA product gas from the vessel, and means for purging the adsorber with a purge gas, the improvement comprising:
a reservoir of the liquid phase of the selected gas, and means for obtaining the purge gas from the reservoir such that the purge gas has a higher concentration of the selected gas than the PSA product gas.

* * * * *

UNITED STATES PATENT AND TRADEMARK OFFICE
CERTIFICATE OF CORRECTION

PATENT NO. : 5,090,973
DATED : February 25, 1992
INVENTOR(S) : Ravi Jain

It is certified that error appears in the above—identified patent and that said Letters Patent is hereby corrected as shown below:

Column 8:

Claim 10, line 1: cancel "7" and substitute --8--

Claim 13, line 3: cancel "sorbed" and substitute --sorber--

Signed and Sealed this

Seventeenth Day of August, 1993

*Attest:*

BRUCE LEHMAN

*Attesting Officer*      *Commissioner of Patents and Trademarks*